J. T. FOSTER.
Oscillating Harrow.
No. { 1,595, }
{ 32,599. }
Patented June 18, 1861.
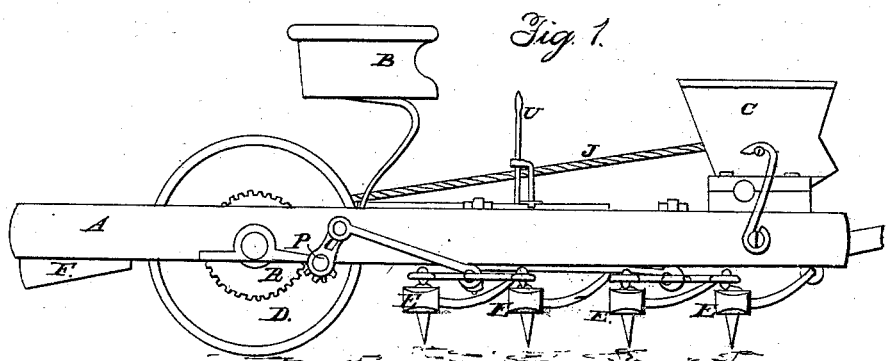
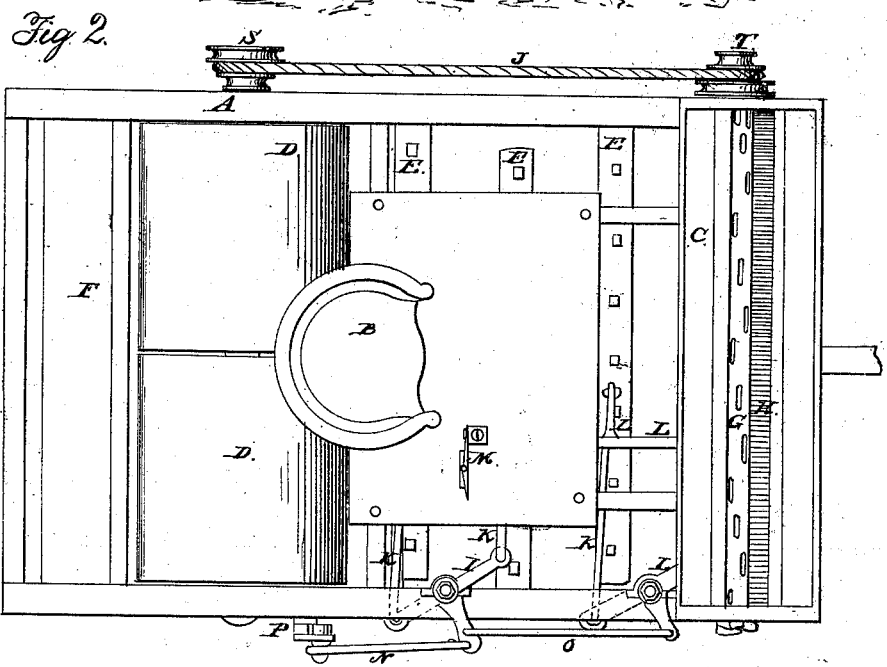
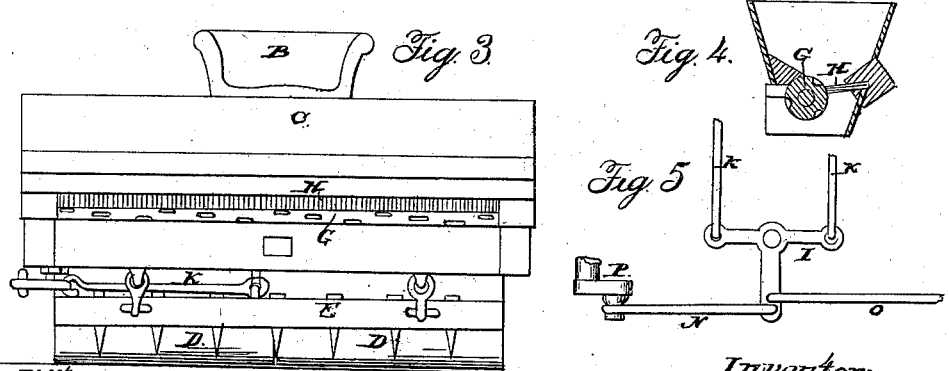
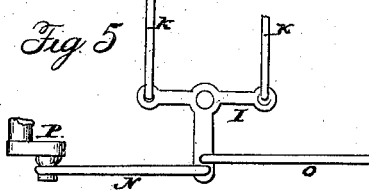

UNITED STATES PATENT OFFICE.

JOHN T. FOSTER, OF JERSEY CITY, NEW JERSEY.

IMPROVEMENT IN HARROWS.

Specification forming part of Letters Patent No. 32,599, dated June 18, 1861.

*To all whom it may concern:*

Be it known that I, JOHN T. FOSTER, of Jersey City, Hudson county, and State of New Jersey, have invented a new and useful Improvement in Agricultural Implements, called the "Oscillating Harrow;" and I hereby declare that the following is a full and exact description thereof.

To enable others to make and use my invention, I now proceed to describe its construction and operation, reference being had to the drawings hereunto annexed and making part of this specification.

Figure 1 is a side elevation of the oscillating harrow. Fig. 2 is a plan of the same. Fig. 3 is an elevation of the forward end. Fig. 4 is a section of the seed-box. Fig. 5 is a diagram showing the driving-crank and the vibrating crank and connecting-rods for oscillating the bars of the harrow.

The same letters refer to the same things in all the drawings.

A is the frame; B, the driver's seat; C, the seed-box; D, the rollers; E, the oscillating bars of the harrow; F, ballast-box to load the rear; G, seeding-roller; H, permanent brush against which the seeding-roller turns; I, vibrating cranks for oscillating the bars of the harrow; J, band from a pulley on the shaft of the levelling-rollers D to that of the seeding-roller; K, connecting-rods from the vibrating-crank I to the top of the oscillating bars of the harrow; L, a shaft having an arm upon it for lifting up the bars of the harrow when not required to be used; M, the place of the governing-lever for operating the shaft L; N, connecting-rod from the driving-crank to the first vibrating crank; O, the rod connecting this with the other or forward vibrating crank; P, the driving-crank, which moves the oscillating bars; R, multiplying-gear on the roller-shaft; S, pulley on the same; T, pulley on the seeding-shaft; U, the lever that is used to lift the harrow up from the ground.

The special purpose arrived at in this harrow has been to pulverize the soil by giving the toothed bars of the harrow a double motion, making a zigzag track, and thus at one operation fit it for seeding. The combination with it of the seeding work at the forward part and the rollers to level all make the apparatus complete, whether for sowing and covering for grains broadcast or for planting any seeds in drills. The machine is supported upon the rollers D with or without forward wheels. The box behind the rollers may be so loaded as to balance the whole upon the axles of the rollers, if desired. Between the two rollers on the middle of the axle are two ratchet-wheels, one pawl for each roller, so that when the machine is run back the rollers will be loose on the shaft, but when it is drawn forward the pawls will hold upon the ratchet and work the driving-crank P through the multiplied gear R.

The harrow is suspended beneath the frame, forward of the rollers, by the lever and shaft L, and this is governed by the vertical lever at the driver's right hand.

The harrow has four bars, E, with about same teeth each. Each bar is hung loose, so that its weight will rest upon the ground. At the top of each bar a connecting-rod, K, holds it, and these four rods are pivoted to the vibrating cranks I. The vibrating cranks are on axles set on the inside edge of the frame A, at the right hand of the driver. These cranks are operated by the driving-crank P, with the connecting-rods N and O, so that as the machine is drawn along and the rollers turned, the bars of the harrow oscillate from side to side, two to the right and two to the left, alternately. As this operation prepares the ground for the seed, it can be sown broadcast by the machine or dropped in drills.

In the box at the forward part of the machine are a seeding-roller and a brush, G and H. The box having received the seed, and the seeding-roller being turned by the band J, (connecting with the pulley on the roller-shaft,) the seed is caught in the cavities of the roller—there being few or many, as desired—or in spiral or straight channels, and the brush H, resting against the roller, prevents any kernels passing except those which are in the cavities or channels. Therefore, by having few or many holes in the seeding-roller, or by turning it fast or slow, any number of kernels may be dropped in a given space.

The machine represented is especially adapted for broadcast sowing—the grain to be covered by the harrow—but when required for covering seeds with precision and in drills the seed-box may be placed behind the harrow, and there may be used any of the ordinary methods of depositing and covering seed at a certain depth.

What I claim as my invention, and desire to secure by Letters Patent, is—

Suspending separately and loosely each one of the oscillating bars E, so that it will adapt itself to the inequalities of the surface, constructed and arranged substantially as above described.

J. T. FOSTER.

Witnesses:
OWEN G. WARREN,
J. D. STURTEVANT.